United States Patent
Yoo

(10) Patent No.: US 8,335,628 B2
(45) Date of Patent: Dec. 18, 2012

(54) METHOD FOR CONTROLLING VARIABLE VALVE APPARATUS OF INTERNAL COMBUSTION ENGINE, AND SYSTEM THEREOF

(75) Inventor: Hakmo Yoo, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 751 days.

(21) Appl. No.: 12/512,770

(22) Filed: Jul. 30, 2009

(65) Prior Publication Data

US 2010/0145592 A1 Jun. 10, 2010

(30) Foreign Application Priority Data

Dec. 5, 2008 (KR) .................... 10-2008-0123570

(51) Int. Cl.
*F02D 13/00* (2006.01)

(52) U.S. Cl. ............... 701/102; 701/103; 123/90.11; 123/90.15

(58) Field of Classification Search ........... 123/90.11, 123/90.15, 90.16, 90.17; 701/102, 103; 700/42, 700/282; 73/114.31, 114.32

See application file for complete search history.

(56) References Cited

U.S. PATENT DOCUMENTS

| | | | | |
|---|---|---|---|---|
| 6,655,345 B2 * | 12/2003 | Ogawa et al. | ................. | 123/295 |
| 6,718,922 B2 * | 4/2004 | Yasui | ......................... | 123/90.17 |
| 6,755,165 B2 * | 6/2004 | Kondou et al. | ............ | 123/90.17 |
| 7,143,728 B1 * | 12/2006 | Yasui | ......................... | 123/90.15 |
| 7,191,589 B2 * | 3/2007 | Yasui et al. | ..................... | 60/284 |
| 7,209,823 B2 * | 4/2007 | Yasui et al. | ................... | 701/102 |

FOREIGN PATENT DOCUMENTS

| JP | 9-317503 | * 12/1997 |
|---|---|---|
| JP | 2002-364390 A | 12/2002 |

* cited by examiner

*Primary Examiner* — Hai Huynh
(74) *Attorney, Agent, or Firm* — Morgan, Lewis & Bockius LLP

(57) ABSTRACT

A method for controlling a variable valve apparatus of an internal combustion engine and a system thereof is disclosed. A method for controlling a variable valve apparatus of an internal combustion engine may include: setting a target cam phase corresponding to a current operation state of an engine received from a vehicle controller via a controller area network (CAN) bus; determining whether a deviation of the current cam phase from the target cam phase is greater than a predetermined deviation; calculating a proportion-integral-derivation (PID) sliding surface based on the target cam phase; calculating a control current for controlling a cam phase to move on the sliding surface in a case when the deviation is greater than the predetermined deviation; and operating the variable valve device so that the current cam phase can follow the target cam phase by converting the calculated control current to a driving duty ratio.

9 Claims, 5 Drawing Sheets

METHOD FOR CONTROLLING VARIABLE VALVE APPARATUS OF INTERNAL COMBUSTION ENGINE, AND SYSTEM THEREOF

CROSS-REFERENCE TO RELATED APPLICATION

The present application claims priority to Korean Patent Application No. 10-2008-0123570 filed on Dec. 5, 2008, the entire contents of which are incorporated herein for all purposes by this reference.

BACKGROUND OF THE INVENTION

1. Field of the Invention

The present invention relates to an internal combustion engine, and more particularly to a method for controlling a variable valve apparatus of an internal combustion engine, and a system thereof.

2. Description of Related Art

Performance of an internal combustion engine, particularly a gasoline engine, substantially depends on how efficiently air can be drawn into a combustion chamber.

For better intake efficiency, a variable valve apparatus for varying valve timing is employed such that an optimal amount of air can be drawn into the combustion chamber for various engine speeds.

A hydraulic variable valve apparatus that is typically employed has a drawback in that, when the engine speed is low or engine oil is at a low temperature, torque for operating the apparatus is increased. In addition, such a hydraulic variable valve apparatus does not usually provide sufficient variation of cam phase.

In order to solve such drawbacks, an electronic variable valve apparatus has been widely studied as an alternative for such a hydraulic variable valve apparatus.

The electronic variable valve apparatus shows many merits. For example, it shows higher response speed that a conventional hydraulic variable valve apparatus. An oil pump of an engine may be reduced in size since the electronic variable valve apparatus does not require hydraulic pressure. The electronic variable valve apparatus can be properly operated even if the engine speed is low or the engine oil is at a low temperature, which means that a load for starting the engine may be reduced. Furthermore, exhaust gas may be reduced when the engine is at a low temperature.

In addition, the electronic variable valve apparatus is capable of operating at a wider angle range, which means that fuel consumption is enhanced under a partial load condition, and engine output is increased by maximizing an overlap of intake/exhaust air valves resulting in decreasing a negative pressure in order to decrease a loss caused by pumping under full load conditions.

The electronic variable valve apparatus is typically driven by an electronic clutch or a motor.

The scheme employing the electronic clutch costs less but it is more difficult to control. The scheme employing the motor costs more but it is easier to control.

An example of the electronic variable valve apparatus can be found in Japanese Patent Laid-Open Publication No. 2002-276310.

In order to control an angle of a camshaft according to the conventional scheme, an engine control unit calculates an angular difference $\Delta\theta$ between a reference angle depending on an engine state and a current angle detected by a cam phase sensor, and determines whether the angular difference $\Delta\theta$ is above a predetermined error value.

When the angular difference $\Delta\theta$ is less than the predetermined error value, the current control is maintained, and a clutch release coil and a brake control coil are not applied with a current.

When the angular difference $\Delta\theta$ is above the predetermined error value, it is determined whether the angular difference $\Delta\theta$ is positive or negative. If the angular difference $\Delta\theta$ is positive, a current is applied to the clutch release coil and the brake control coil so as to perform an advance control. If the angular difference $\Delta\theta$ is negative, a current is applied to the clutch release coil and the brake control coil so as to perform a retardation control.

According to the above scheme where a current to be applied to the clutch release coil and the brake control coil is on/off controlled in order to control an angle of a camshaft, calibration maps should be provided depending on control responsiveness, angular error, and engine states.

According to such a scheme, a huge amount of experimentation is required in order to sufficiently prepare precise calibration maps, which causes the cost for newly designing a vehicle to substantially increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method for controlling a variable valve apparatus of an internal combustion engine having advantages of providing reliability for controlling a current cam phase to follow a target cam phase, and a quick response in a low load state of the engine by controlling the cam phase of the electronic variable valve apparatus through a proportion-integral-derivation (PID) sliding mode control method.

In an aspect of the present invention, a method for controlling a variable valve apparatus of an internal combustion engine, may include (a) setting a target cam phase corresponding to a current operation state of the engine received from a vehicle controller via a controller area network (CAN) bus, (b) determining whether a deviation of a current cam phase from the target cam phase is greater than a predetermined deviation, (c) calculating a proportion-integral-derivation (PID) sliding surface based on the target cam phase in a case when the deviation is greater than the predetermined deviation, (d) calculating a control current for controlling a cam phase to move on the PID sliding surface, and (e) operating the variable valve apparatus so that a current cam phase can follow the target cam phase by converting the calculated control current to a driving duty ratio.

A final control current may be obtained by applying a current compensation value according to engine oil temperature and a non-linear output calculated in the PID sliding surface to the control current calculated in the step (d).

The final control current may be obtained by applying the current compensation value according to an engine speed.

In another aspect of the present invention, the system for controlling a variable valve apparatus of an internal combustion engine, may include a detecting means detecting an operation state of an engine, a vehicle controller determining a target cam phase according to the operation state of the engine, a variable valve controller determining a cam phase compensation value by comparing the target cam phase obtained in the vehicle controller with a current cam phase, and a variable valve device that is mounted at a camshaft, and that controls a cam phase according to a signal received from the variable valve controller in order for the current cam phase to follow the target cam phase.

The system may further include a memory for storing the target cam phase according to the operation state of the engine as mapping data.

The detecting means may include a cam phase sensor detecting the current cam phase, a crank phase sensor detecting a phase of a crankshaft, and an oil temperature sensor detecting an engine oil temperature.

The vehicle controller and variable valve controller may be connected to each other via a CAN bus in order to transmit or receive data therebetween.

The variable valve controller may determine the cam phase compensation value using the current cam phase, a phase of the crankshaft, an engine oil temperature, an engine speed, and a gradient of the cam phase.

The variable valve controller may control the current cam phase to follow the target cam phase through a proportion-integral-derivation (PID) sliding mode control method.

The variable valve controller may include a synchronizing portion synchronizing a signal detected by a cam phase sensor and a signal detected by a crank phase sensor in order to obtain the current cam phase, a comparator obtaining a deviation by comparing the target cam phase determined by the vehicle controller with the current cam phase obtained by the synchronizing portion, a control portion that determines a cam phase compensation control current according to the deviation obtained by the comparator, and that advances or retards the cam phase through PID sliding mode control method, and a driving portion operating the variable valve apparatus according to a control signal of the control portion in order to control the current cam phase to follow the target cam phase.

The variable valve device may include spine shaft unit having an interior shaft mounted at an end of the camshaft, an advance shaft engaged with an exterior circumference of the interior shaft by a helical gear structure, and an exterior shaft engaged with an exterior circumference of the advance shaft by helical gears structure, a chain sprocket that is mounted behind the interior shaft and the exterior shaft of the spline shaft unit on the camshaft so that power is transferred to a drive sprocket of the crankshaft through a timing chain, a damper disk that is mounted in front of the interior shaft of the spline shaft unit and a rear side of which is supported by one end of the advance shaft, and wherein a torsion coil spring is interposed between the exterior shaft and a friction surface is formed at the front thereof, and an electronic clutch that is fixedly mounted at a chain cover so as to be corresponded to the damper disk, and is frictionally contacted to the damper disk through which it is magnetized according to a control signal.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
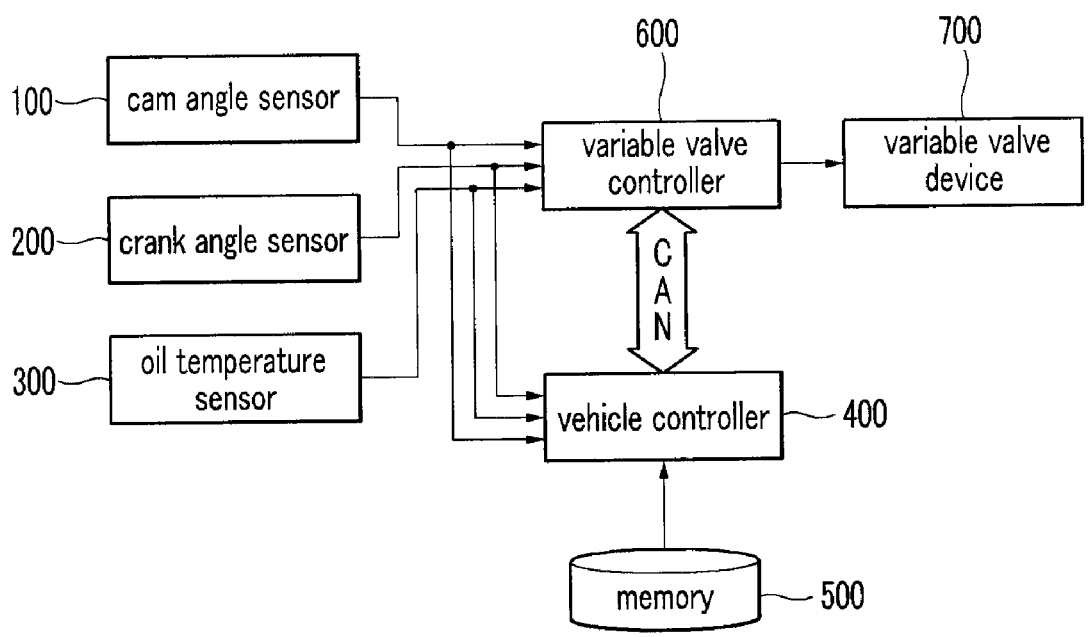
FIG. 1 is a block diagram for an apparatus for controlling a variable valve apparatus of an internal combustion engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a block diagram for an apparatus for controlling a variable valve apparatus of an internal combustion engine according to an exemplary embodiment of the present invention.

An apparatus for controlling a variable valve apparatus of an internal combustion engine according to an exemplary embodiment of the present invention includes a cam phase sensor 100, a crank phase sensor 200, an oil temperature sensor 300, a vehicle controller 400, a memory 500, a variable valve controller 600, and a variable valve apparatus 700.

The cam phase sensor 100 detects an angular position of a camshaft (hereinafter called a cam phase) of an internal combustion engine, and provides information for the detected angular position of the camshaft to the vehicle controller 400 and the variable valve controller 600.

The crank phase sensor 200 detects an angular position of a crankshaft (hereinafter called a crank phase) of the internal combustion engine, and provides information on the detected crank phase to the vehicle controller 400 and the variable valve controller 600.

The oil temperature sensor 300 detects the temperature of the engine oil providing functions such as lubrication, as an anticorrosive, providing air-tightness, and cooling, and provides information on the detected engine oil temperature to the vehicle controller 400 and the variable valve controller 600.

The vehicle controller 400 connecting to the variable valve controller 500 via a controller area network (hereinafter called CAN) bus recognizes a state of the engine by analyzing the cam phase detected by the cam phase sensor 100 and the crank phase detected by the crank phase sensor 200, and extracts a target cam phase from a data table mapped at the memory 500 in order to transfer it to the variable valve controller 600 via the CAN bus.

In the memory 500, the target cam phase is mapped at the data table according to various states of operation of the engine.

When the target cam phase is transferred from the vehicle controller 400 to the variable valve controller 600, the variable valve controller 600 analyzes the cam phase detected by the cam phase sensor 100 and the crank phase, the engine oil temperature, the engine speed, a gradient of the engine speed, etc., and then operates the variable valve device 700 in a PID sliding mode control method so as to control the cam phase to follow the target cam phase.

Unlike a conventional hydraulic variable valve controller, the variable valve device 700 is mounted at the camshaft, and controls the cam phase according to a control signal received from the variable valve controller 600 in order to control the cam phase to follow the target cam phase determined according to a state of the engine.

Figure 2:
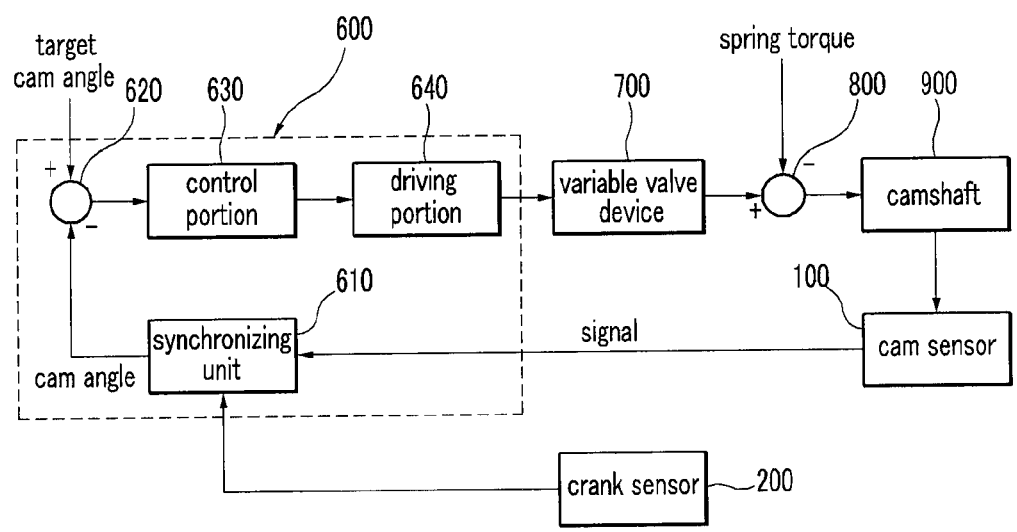
FIG. 2 is a block diagram that shows a detailed configuration of an apparatus for controlling a variable valve apparatus of an internal combustion engine according to an exemplary embodiment of the present invention.

FIG. 2 is a block diagram that shows a detailed configuration of an apparatus for controlling a variable valve apparatus of an internal combustion engine according to an exemplary embodiment of the present invention.

As shown in FIG. 2, the variable valve controller 600 includes a synchronizing unit 610, a comparator 620, a control portion 630, and a driving portion 640.

The synchronizing unit 610 synchronizes a signal regarding the cam phase that is detected by the cam phase sensor 100 and a signal regarding the crank phase that is detected by the crank phase sensor 200 in order to extract a substantial cam phase.

The comparator 620 compares a target cam phase corresponding to a current operation state received from the vehicle controller 400 through the CAN bus with a current cam phase extracted from the synchronizing unit 610, and outputs results in accordance therewith.

The control portion 630 outputs a control signal by determining a control current for advancing or retarding the cam phase in a PID sliding mode control method so as to follow the target cam phase according to results received from the comparator 620.

The driving portion 640 controls an operation of the variable valve device 700, which is an electrical clutch type, according to the current control signal received from the control portion 630, and controls the cam phase to follow the target cam phase determined according to the current state of the engine.

At this time, an operating force of the variable valve device 700 is added to a spring torque 800, and further adjusts the camshaft 900, and then the cam phase is followed to a target cam phase.

An operation of the above will be explained hereinafter.

When the variable valve controller 600 receives a target cam phase from the vehicle controller 400 through the CAN bus, signals of the cam phase sensor 100 and the crank phase sensor 200 are synchronized so as to extract a cam phase, and are then transferred to the control portion 630 after detecting a difference therebetween.

The control portion 630 outputs a control signal by determining a control current advancing or retarding the cam phase in a PID sliding mode control method so as to follow the target cam phase according to results received from the comparator 620.

Figure 3:
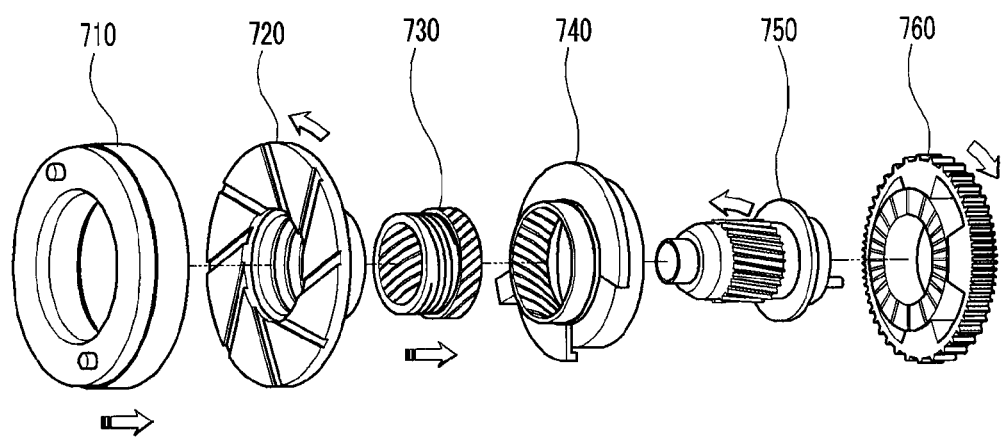
FIG. 3 is an exploded perspective view of an apparatus for controlling a variable valve apparatus of an internal combustion engine according to an exemplary embodiment of the present invention.

FIG. 3 is an exploded perspective view of an apparatus for controlling a variable valve apparatus of an internal combustion engine according to an exemplary embodiment of the present invention.

As shown in FIG. 3, the variable valve device 700 includes an electronic clutch 710, a damper disk 720, an advance shaft 730, an exterior shaft 740, an interior shaft 750, and a chain sprocket 760.

The electronic clutch 710 is mounted at a chain cover of an engine, and may be magnetized so as to make contact with the damper disk 720 and generate a frictional force when a control signal is applied.

The interior shaft 750 is mounted at an end of the camshaft. The advance shaft 730 is engaged in a mesh with an exterior circumference of the interior shaft 750 by a helical gear structure. Further, the exterior shaft 740 is engaged in a mesh with an exterior circumference of the advance shaft 730 so as to form a spline shaft unit.

The chain sprocket 760 is mounted behind the interior shaft 750 and the exterior shaft 740 of the spline shaft unit on the camshaft so that power is transferred to the drive sprocket of the crankshaft by a timing chain.

The damper disk 720 is mounted in front of the interior shaft 750 of the spline shaft unit. A rear side of the damper disk 720 is supported by one end of the advance shaft 730. Further, a torsion coil spring is interposed between the exterior shaft 740 so that a friction surface is defined to generate a friction force in case of contact with the electronic clutch 710 in front thereof.

Such a variable valve apparatus 700 may be expressed as a second order differential equation of the following Equation 1.

$$Jd \times \frac{d\theta^2}{d^2 t} + Dd \times \frac{d\theta}{dt} + (Kn \times \theta + \text{Spring torque}) = \qquad \text{(Equation 1)}$$

$$k \times \sigma^2 \times i^2 - T_{OT}$$

Herein, T denotes spring torque, Jd denotes momentum inertia, $\theta$ denotes a cam phase, Dd denotes a viscosity coefficient, Kn denotes a spring constant, I denotes an applied current, $T_{oT}$ denotes a compensation map according to engine oil temperature, $\sigma$ denotes a magnetic hysteresis curve applied to a clutch, and K denotes a constant that can be calculated by physical structure or property value.

The magnetic hysteresis curve applied to a clutch is represented as in the following Equation 2.

$$\sigma = \frac{B(t)}{H(t)} \qquad \text{(Equation 2)}$$

Herein,
B(t) denotes magnetic field intensity and H(t) denotes magnetic flux density.

If a PID sliding surface is defined as in following Equation 3, a differential equation S' is represented as follows.

$$S = \lambda 1 \times \tilde{\theta} + \dot{\theta}' + \lambda 2 \times \int \tilde{\theta} dt \qquad \text{(Equation 3)}$$

$$\dot{S} = \lambda 1(\dot{\theta} - \dot{\theta}d) + \ddot{\theta} - \ddot{\theta}d + \lambda 2(\theta - \theta d) \qquad \text{(Equation 4)}$$

In Equation 3 and Equation 4, an estimated error $\tilde{\theta}$ is defined as $\tilde{\theta}=\theta-\theta d$ and $\lambda 1$ denotes an error variation slope, and $\lambda 2$ denotes an error slope.

In the Equation 4, S is equal to zero for being maintained as a PID slide surface, and Equation 4 is expressed as in the following Equation 5.

$$\ddot{\theta}=\ddot{\theta}d+\lambda 1(\dot{\theta}d-\dot{\theta})+\lambda 2(\theta d-\theta) \quad \text{(Equation 5)}$$

Accordingly, if Equation 5 is substituted for Equation 1, Equation 6 is determined so as to obtain an estimated control current of a clutch.

$$\hat{I}^2 = \frac{1}{k\sigma^2}\left[Jd(\ddot{\theta}d+\lambda 1(\dot{\theta}d-\dot{\theta})+\lambda 2(\theta d-\theta))+ \right. \quad \text{(Equation 6)}$$
$$\left. Dd \times \dot{\theta} + Kn \times \theta + \text{Spring torque} + T_{OT}\right]$$

Equation 6 is expressed as in the following Equation 7.

$$\hat{I} = \frac{1}{k\sigma^2}[Jd(\ddot{\theta}d+\lambda 1(\dot{\theta}d-\dot{\theta})+\lambda 2(\theta d-\theta))+ \quad \text{(Equation 7)}$$
$$Dd \times \dot{\theta} + Kn \times \theta + \text{Spring torque} + T_{OT}]^{\frac{1}{2}}$$

Therefore, in Equation 7, a control current for operating an electronic variable valve device using PID sliding surface as a non-linear control output is expressed as in the following Equation 8.

$$I=\hat{I}+K\,sgn(S) \quad \text{(Equation 8)}$$

An operation of adjusting a cam phase according to an engine state with the PID sliding method is described hereinafter.

When the engine is running, the chain sprocket 760 is driven by the engine through a timing chain, and accordingly the camshaft connected thereto rotates.

The spline shaft unit having the advance shaft 730, the exterior shaft 740, and the interior shaft 750 that are engaged with each other by a helical gear structure also rotates with the rotation of the chain sprocket 760. In addition, the damper disk in front of the interior shaft 750 also rotates according to the rotation of the chain sprocket 760.

At the same time, the variable valve controller 600 obtains a deviation by comparing a target cam phase corresponding to a current operation state transferred from the vehicle controller 400 via the CAN bus with a current cam phase detected by the cam phase sensor 100 and the crank phase sensor 200, and then generates a control current so as to control the cam phase to follow the target cam phase and output the current to the variable valve device 700 by compensating the deviation obtained therefrom.

Then, the electronic clutch 710 in the variable valve device 700 is magnetized and moves to the damper disk 720 so as to make contact therewith such that a frictional torque is generated by the friction surface of the damper disk 720.

Therefore, a rotating speed of the damper disk 720 is slower than that of the exterior shaft connected to the camshaft, and due to the slower speed of the damper disk 720, the damper disk 720 exerts a force in a direction indicated by the arrow.

Therefore, the interior shaft 750 engaged with the chain sprocket 760 varies an angle of the chain sprocket 760 that is connected with the camshaft.

Therefore, the cam phase is varied by the change of the angle of the chain sprocket 760 in order to control the cam phase to follow the target cam phase.

At this time, a torque outputted from the variable valve device 700 in comparison with a torque of the spring of the torsion coil varies an angle of the camshaft 900.

While such an operation is performed, the synchronizing unit 610 obtains a current cam phase by comparing signals from the cam phase sensor 100 and the crank phase sensor 200.

The obtained current cam phase is compared with the target cam phase at the comparator 620, and the comparison result is provided to the control portion 630.

Depending on the comparison result, the control portion 630 varies a level of the current applied to the electronic clutch 710 of the variable valve device 700 until the current cam phase follows the target cam phase.

Figure 4:
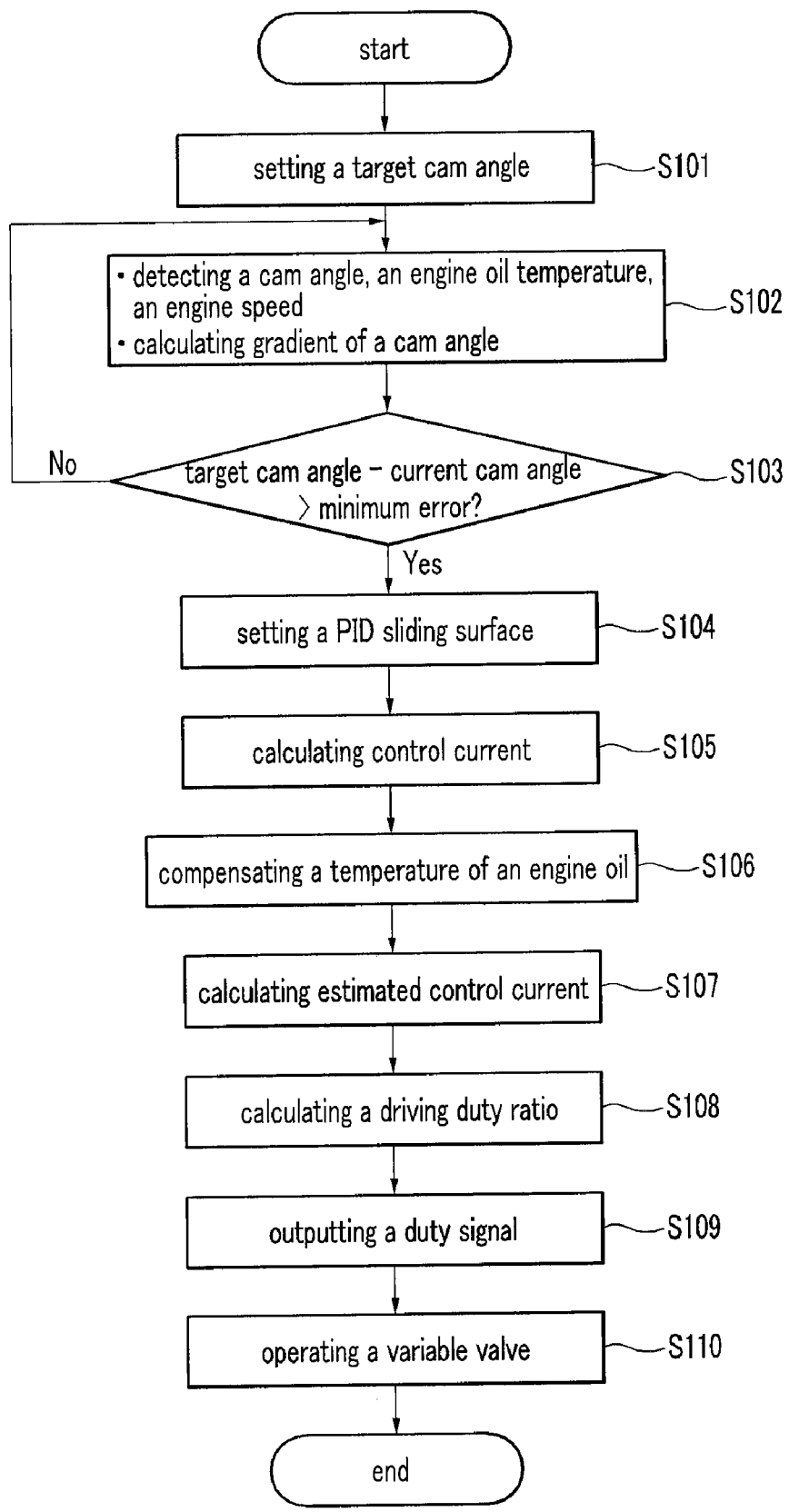
FIG. 4 is a flowchart for a method for controlling a variable valve apparatus of an internal combustion engine according to an exemplary embodiment of the present invention.

FIG. 4 is a flowchart for a method for controlling a variable valve apparatus of an internal combustion engine according to an exemplary embodiment of the present invention.

The variable valve controller 600 receives a target cam phase according to a current operation state from the vehicle controller 400 via the CAN bus in step S101, and after detecting the current cam phase, crank phase, and engine oil temperature, calculates engine speed by the crank phase, and further calculates a variation rate of the cam phase, in step S102.

Then, the variable valve controller 600 obtains an error by comparing the target cam phase received from the vehicle controller 400 with the current cam phase, and determines whether the error is greater than a minimum error, in step S103.

If the obtained error in step S103 is less than the predetermined minimum error, it is considered that the current cam phase follows the predetermined target cam phase, and then returns to step S102.

If the obtained error in step S103 is greater than the predetermined minimum error, it is considered that the current cam phase does not follow the predetermined target cam phase, and the PID sliding surface S is set as defined in Equation 3 so as to compensate the cam phase in step S104.

Further, the variable valve controller 600 calculates an estimated control current so as to compensate the cam phase to be proportional to an error by applying Equation 6 in step S105.

Because control responsiveness of the clutch type of electronic variable valve device depends on the condition of the engine speed and engine oil temperature, the controller calculates a compensation current value corresponding to the engine speed and engine oil temperature in step S106.

Then, a compensation value corresponding to the engine speed and engine oil temperature obtained in step S106 is applied to the estimated control current calculated in step S105, and a control current for driving the electronic variable valve device as a non-linear control output is calculated by Equation 7 and Equation 8 in step S107.

In addition, the calculated control current is converted to a drive duty ratio in step S108. Further, the variable valve controller 600 outputs a duty signal in order to operate the electronic variable valve device of the clutch type in step S109, and thereby controls the cam phase to follow the predetermined target angle in step S110.

Figure 5:
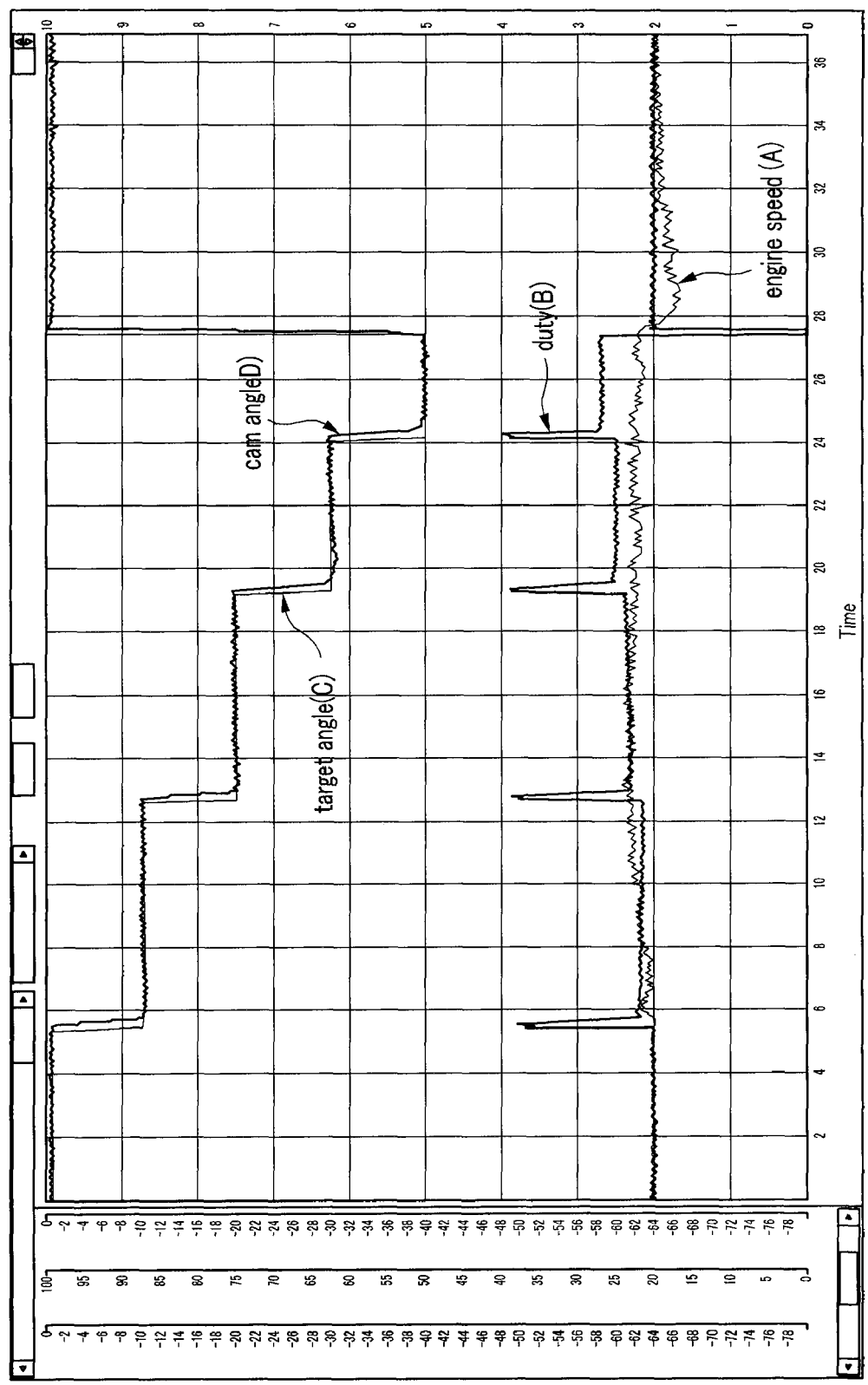
FIG. 5 is a graph showing results of control of a PID sliding mode method according to an exemplary embodiment of the present invention.

FIG. 5 is a graph showing results of control of the PID sliding mode method according to an exemplary embodiment of the present invention in a state in which the engine speed is 600 RPM and the engine oil temperature is 85° C.

As can be shown in the drawings, a current cam phase D has a quick response property under a low engine speed A, and is following the target cam phase C well.

For convenience in explanation and accurate definition in the appended claims, the terms "front", "rear", "inner", and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a variable valve apparatus of an internal combustion engine, comprising:
    (a) setting a target cam phase corresponding to a current operation state of the engine received from a vehicle controller via a controller area network (CAN) bus;
    (b) determining whether a deviation of a current cam phase from the target cam phase is greater than a predetermined deviation;
    (c) calculating a proportion-integral-derivation (PID) sliding surface based on the target cam phase in a case when the deviation is greater than the predetermined deviation;
    (d) calculating a control current for controlling a cam phase to move on the PID sliding surface; and
    (e) operating the variable valve apparatus so that a current cam phase can follow the target cam phase by converting the calculated control current to a driving duty ratio;
    wherein a final control current is obtained by applying a current compensation value according to engine oil temperature and a non-linear output calculated in the PID sliding surface to the control current calculated in the step (d).

2. The method of claim 1, wherein the final control current is obtained by applying the current compensation value according to an engine speed.

3. A system for controlling a variable valve apparatus of an internal combustion engine, comprising:
    a detecting means detecting an operation state of an engine;
    a vehicle controller determining a target cam phase according to the operation state of the engine;
    a variable valve controller determining a cam phase compensation value by comparing the target cam phase obtained in the vehicle controller with a current cam phase; and
    a variable valve device that is mounted at a camshaft, and that controls a cam phase according to a signal received from the variable valve controller in order for the current cam phase to follow the target cam phase;
    wherein the variable valve controller determines the cam phase compensation value using the current cam phase, a phase of the crankshaft, an engine oil temperature, an engine speed, and a gradient of the cam phase.

4. The system of claim 3, further comprising a memory for storing the target cam phase according to the operation state of the engine as mapping data.

5. The system of claim 3, wherein the detecting means comprises:
    a cam phase sensor detecting the current cam phase;
    a crank phase sensor detecting a phase of a crankshaft; and
    an oil temperature sensor detecting an engine oil temperature.

6. The system of claim 3, wherein the vehicle controller and variable valve controller are connected to each other via a CAN bus in order to transmit or receive data therebetween.

7. The system of claim 3, wherein the variable valve controller controls the current cam phase to follow the target cam phase through a proportion-integral-derivation (PID) sliding mode control method.

8. The system of claim 3, wherein the variable valve controller comprises:
    a synchronizing portion synchronizing a signal detected by a cam phase sensor and a signal detected by a crank phase sensor in order to obtain the current cam phase;
    a comparator obtaining a deviation by comparing the target cam phase determined by the vehicle controller with the current cam phase obtained by the synchronizing portion;
    a control portion that determines a cam phase compensation control current according to the deviation obtained by the comparator, and that advances or retards the cam phase through PID sliding mode control method; and
    a driving portion operating the variable valve apparatus according to a control signal of the control portion in order to control the current cam phase to follow the target cam phase.

9. The system of claim 3, wherein the variable valve device comprises:
    a spline shaft unit having an interior shaft mounted at an end of the camshaft, an advance shaft engaged with an exterior circumference of the interior shaft by a helical gear structure, and an exterior shaft engaged with an exterior circumference of the advance shaft by helical gears structure;
    a chain sprocket that is mounted behind the interior shaft and the exterior shaft of the spline shaft unit on the camshaft so that power is transferred to a drive sprocket of the crankshaft through a timing chain;
    a damper disk that is mounted in front of the interior shaft of the spline shaft unit and a rear side of which is supported by one end of the advance shaft, and wherein a torsion coil spring is interposed between the exterior shaft and a friction surface is formed at the front thereof; and
    an electronic clutch that is fixedly mounted at a chain cover so as to be corresponded to the damper disk, and is frictionally contacted to the damper disk through which it is magnetized according to a control signal.

* * * * *